United States Patent
Fujimura et al.

(10) Patent No.: US 8,005,263 B2
(45) Date of Patent: Aug. 23, 2011

(54) HAND SIGN RECOGNITION USING LABEL ASSIGNMENT

(75) Inventors: Kikuo Fujimura, Palo Alto, CA (US); Lijie Xu, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 970 days.

(21) Appl. No.: 11/925,557

(22) Filed: Oct. 26, 2007

(65) Prior Publication Data

US 2009/0110292 A1    Apr. 30, 2009

(51) Int. Cl.
*G06K 9/00* (2006.01)
*G06F 3/033* (2006.01)
*H04M 11/00* (2006.01)

(52) U.S. Cl. ............ 382/103; 382/154; 715/863; 379/52

(58) Field of Classification Search .................. 382/103, 382/154; 715/863; 379/52
See application file for complete search history.

(56) References Cited

U.S. PATENT DOCUMENTS

| | | | |
|---|---|---|---|
| 5,454,043 A | 9/1995 | Freeman | |
| 5,581,276 A | 12/1996 | Cipolla et al. | |
| 5,594,469 A | 1/1997 | Freeman et al. | |
| 5,787,197 A | 7/1998 | Beigi et al. | |
| 6,002,808 A | 12/1999 | Freeman | |
| 6,128,003 A | 10/2000 | Smith et al. | |
| 6,215,890 B1 | 4/2001 | Matsuo et al. | |
| 6,720,949 B1 | 4/2004 | Pryor et al. | |
| 6,788,809 B1 * | 9/2004 | Grzeszczuk et al. | 382/154 |
| 6,804,396 B2 | 10/2004 | Higaki et al. | |
| 6,819,782 B1 | 11/2004 | Imagawa et al. | |
| 6,950,534 B2 | 9/2005 | Cohen et al. | |
| 7,095,401 B2 | 8/2006 | Liu et al. | |
| 7,224,830 B2 | 5/2007 | Nefian et al. | |
| 7,274,800 B2 | 9/2007 | Nefian et al. | |
| 7,308,112 B2 | 12/2007 | Fujimura et al. | |
| 7,340,077 B2 | 3/2008 | Gokturk et al. | |
| 7,372,977 B2 * | 5/2008 | Fujimura et al. | 382/103 |
| 7,379,563 B2 * | 5/2008 | Shamaie | 382/103 |
| 2002/0041327 A1 * | 4/2002 | Hildreth et al. | 348/42 |

(Continued)

FOREIGN PATENT DOCUMENTS

WO    WO 00/30023 A1    5/2000

(Continued)

OTHER PUBLICATIONS

Gvili, R., et al., "Depth Keying", SPIE Elec. Imaging, 2003.

(Continued)

*Primary Examiner* — Aaron W Carter
(74) *Attorney, Agent, or Firm* — Fenwick & West LLP; Mark E. Duell

(57) ABSTRACT

A method and system for recognizing hand signs that include overlapping or adjoining hands from a depth image. A linked structure comprising multiple segments is generated from the depth image including overlapping or adjoining hands. The hand pose of the overlapping or adjoining hands is determined using either (i) a constrained optimization process in which a cost function and constraint conditions are used to classify segments of the linked graph to two hands or (ii) a tree search process in which a tree structure including a plurality of nodes is used to obtain the most-likely hand pose represented by the depth image. After determining the hand pose, the segments of the linked structure are matched with stored shapes to determine the sign represented by the depth image.

25 Claims, 12 Drawing Sheets

U.S. PATENT DOCUMENTS

| | | | |
|---|---|---|---|
| 2004/0189720 A1 | 9/2004 | Wilson et al. | |
| 2004/0193413 A1 | 9/2004 | Wilson et al. | |
| 2005/0031166 A1* | 2/2005 | Fujimura et al. | 382/103 |
| 2005/0238201 A1* | 10/2005 | Shamaie | 382/103 |
| 2006/0033713 A1 | 2/2006 | Pryor | |
| 2006/0209021 A1* | 9/2006 | Yoo et al. | 345/156 |
| 2007/0216642 A1* | 9/2007 | Kneissler | 345/156 |
| 2008/0212836 A1* | 9/2008 | Fujimura et al. | 382/103 |
| 2008/0219502 A1* | 9/2008 | Shamaie | 382/103 |
| 2009/0110292 A1* | 4/2009 | Fujimura et al. | 382/203 |
| 2010/0060576 A1* | 3/2010 | Underkoffler et al. | 345/158 |
| 2010/0066676 A1* | 3/2010 | Kramer et al. | 345/158 |

FOREIGN PATENT DOCUMENTS

| | | |
|---|---|---|
| WO | WO 2004/097612 A2 | 11/2004 |
| WO | WO 2004/097612 A3 | 11/2004 |

OTHER PUBLICATIONS

Ishibuchi et al., "Real Time Vision-Based Hand Gesture Estimatiohn for a Human-Computer Interface", Systems and Computers in Japan, vol. 28, No. 7, 1997.

Redert et al., "ATTEST: Advanced Three-dimensional Television System technologies", Proceedings of the First International Symposium on 3D Data Processing Visualization and Transmission (3DPVT02), 2002.

Zhu et al., "3D Head Pose Estimation with Optica Flow and Depth Constraints", Proceedings of the Fourth International Conference on 3D Digital Imaging and Modeling, 2003.

Athitsos, V. et al., "An Appearance-Based Framework for 3D Hand Shape Classification and Camera Viewpoint Estimation," Proceedings of the Fifth IEEE International Conference on Automatic Face and Gesture Recognition (FGR'02), IEEE, 2002, 8 pages.

Bretzner, L. et al., "Hand Gesture Recognition using Multi-Scale Colour Features, Hierarchical Models and Particle Filtering," Proceedings of the Fifth IEEE International Conference on Automatic Face and Gesture Recognition (FGR'02), IEEE, 2002, 8 pages.

Gavrila, D.M. et al., "Real-Time Object Detection for "Smart" Vehicles," The Proceedings of the Seventh IEEE International Conference on Computer Vision, Sep. 20-27, 1999, 10 pages.

Iddan, G.J. et al., "3D Imaging in the Studio (and Elsewhere . . . )" Proceedings of the SPIE, Jan. 24-25, 2001, pp. 48-55, vol. 4298.

Jojic, N. et al., "Detection and Estimation of Pointing Gestures in Dense Disparity Maps," Fourth IEEE International Conference on Automatic Face and Gesture Recognition, Mar. 28-30, 2000, 15 pages.

Malassiotis, S. et al., "A Gesture Recognition System using 3D Data," Proceedings of the First International Symposium on 3D Data Processing Visualization and Transmission (3DPVT'02), IEEE, 2002, pp. 1-4.

Oka, K. et al., "Real-Time Tracking of Multiple Fingertips and Gesture Recognition for Augmented Desk Interface System," Proceedings of the Fifth IEEE International Conference on Automatic Face and Gesture Recognition (FGR'02), IEEE, 2002, 12 pages.

Pavlovic, V.I. et al., "Visual Interpretation of Hand Gestures for Human-Computer Interaction: A Review," IEEE Transactions on Pattern Analysis and Machine Intelligence, Jul. 1997, vol. 17, No. 7.

Polat, E. et al., "Robust Tracking of Human Body Parts for Collaborative Human Computer Interaction," Computer Vision and Image Understanding, 2003, pp. 44-69, vol. 89.

Sakagami, Y. et al., "The Intelligent ASIMO: System Overview and Integration," Proceedings of the 2002 IEEE/RSJ, Intl. Conference on Intelligent Robots and Systems, IEEE, 2002, pp. 2478-2483.

Starner, T. et al., "Real-Time American Sign Language Recognition Using Desk and Wearable Computer Based Video," IEEE Transactions on Pattern Analysis and Machine Intelligence, Dec. 1996, pp. 1371-1375, vol. 20, No. 12.

Vogler, C. et al., "ASL Recognition Based on a Coupling Between HMMs and 3D Motion Analysis," Sixth International Conference on Computer Vision, Jan. 4-7, 1998, pp. 363-369.

Wilson, A.D. et al., "Parametric Hidden Markov Models for Gesture Recognition," IEEE Transactions on Pattern Analysis and Machine Intelligence, Sep. 1999, pp. 884-900, vol. 21, No. 9.

Zhu, X. et al., "Segmenting Hands of Arbitrary Color," Proceedings of the Fourth IEEE International Conference on Automatic Face and Gesture Recognition, Mar. 28-30, 2000, pp. 446-453.

Zhu, Y., et al., "A Real-Time Approach to the Spotting, Representation, and Recognition of Hand Gestures for Human-Computer Interaction," Computer Vision and Image Understanding, 2002, pp. 189-208, vol. 85.

Lee et al., "Online, Interactive Learning of Gestures for Human/Robot Interfaces," Proceedings of the 1996 IEEE International Conference on Robotics and Automation, Apr. 1996, pp. 2982-2987.

PCT International Search Report and Written Opinion, PCT/US08/75276, Nov. 13, 2008.

Teófilo Emidio De Campos, 3D *Visual Tracking of Articulated Objects and Hands*, Robotics Research Group, Department of Engineering Science, University of Oxford, Trinity Term 2006, pp. 1-212, England.

Eun-Jung Holden et al, *Visual Sign Language Recognition*, [online], [Retrieved on Feb. 5, 2008], pp. 1-5, Retrieved from the URL: http://www.postgraduate.uwa.edu.au/about/PVCR/publications?f=147693.

F. Le Jeune et al, *Tracking of Hand's Posture and Gesture*, [online], [Retrieved on Feb. 5, 2008, dated Oct. 2004], pp. 1-26, Retrieved from the URL:http://www.enpc.fr/certis/publications/papers/04certis02.pdf.

Ronen Gvili et al, *Depth keying*, 3DV Systems Ltd., pp. 1-11, 2003.

Claudia Nölker et al, *Visual Recognition of Continuous Hand Postures*, [online], [Retrieved on Feb. 5, 2008], pp. 155-178, Retrieved from the URL: http://www.phonetik.uni-muenchen.de/FIPKM/vol37/hamp_noelker.pdf.

Thad Eugene Starner, *Visual Recognition of American Sign Language Using Hidden Markov Models*, [online], [Retrieved on Feb. 5, 2008, dated Feb. 1995], pp. 1-52, Retrieved from the URL: http://citeseer.ist.psu.edu/124187.htm.I.

Jochen Triesch et al, *Classification of hand postures against complex backgrounds using elastic graph matching*, Image and Vision Computing, Jul. 11, 2002, pp. 937-943, vol. 20.

\* cited by examiner

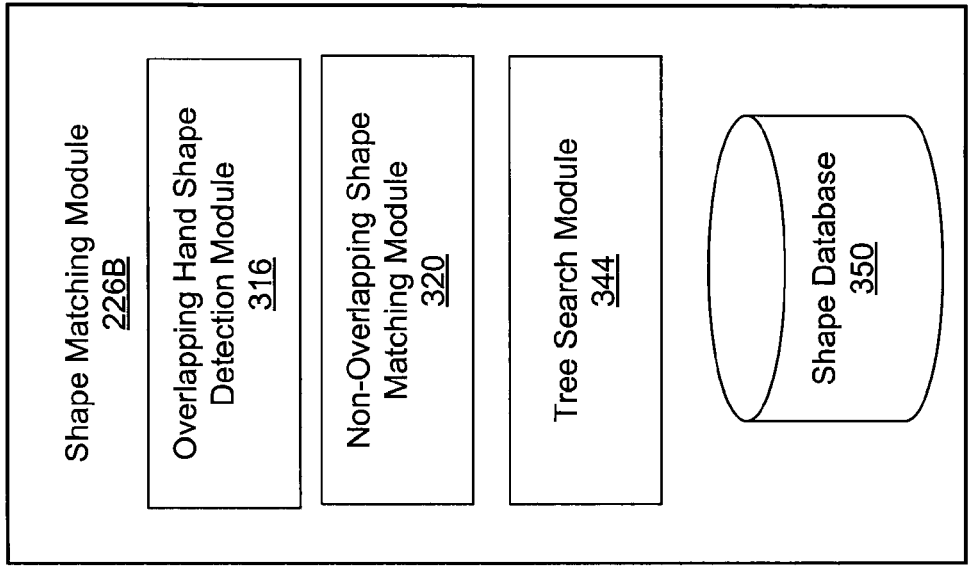
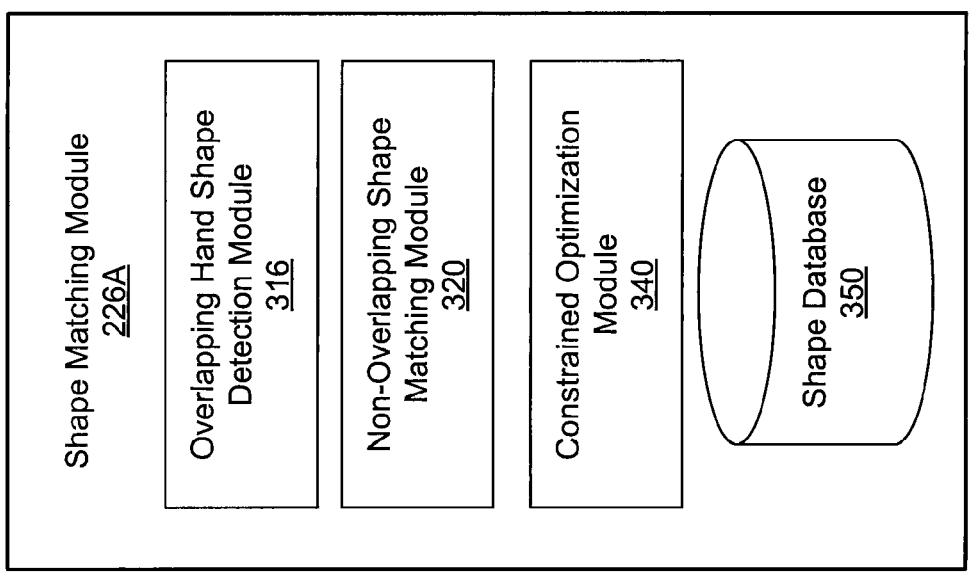

HAND SIGN RECOGNITION USING LABEL ASSIGNMENT

CROSS-REFERENCE To RELATED APPLICATIONS

This application is related to U.S. patent application Ser. No. 11/129,164 titled "Sign Based Human-Machine Interaction" filed on May 12, 2005 by Fujimura et al. and published as U.S. Patent Application Publication No. 2005/0271279, which is incorporated herein by reference in its entirety.

BACKGROUND OF THE INVENTION

1. Field of the Invention

The present invention relates generally to human-machine interaction, and more particularly to recognizing hand signs in sign language.

2. Description of Background Art

With the advent of super-fast computing systems and highly efficient digital imaging systems, the field of computer vision based man-machine interaction has undergone a period of significant technological advancements. From simple motion detection systems where motion triggers a response from a machine (e.g., surveillance systems) to highly complex three-dimensional ("3D") imaging sign recognition systems have been the subject of significant development in the last few years. For example, in the area of sign based human-machine communications, the recognition of human sign language has been a subject of much study lately as a promising technology for man-machine communications. Other sign recognition systems and even more complex gesture recognition systems have been developed based on various methods to locate and track hands and their motion with respect to other body parts (e.g., arms, torso, head, and the like).

These conventional techniques for sign and gesture recognition generally require markers, specific colors, backgrounds or gloves to aid the machine vision system in finding the source of the sign or gesture. For example, some conventional approaches for hand detection use color or motion information to determine the image region that corresponds to the hand or hands gesturing to the system. In these approaches, tracking hand motion is highly unreliable under varying lighting conditions. Some systems use special equipment such as gloves, while some others use a background with specific color to make the task feasible.

Another group of conventional techniques uses depth images generated by stereo vision cameras or time-of-flight sensors for sign and gesture recognition. The depth images are analyzed to extract image pixels representing hands and arms. The extracted image pixels are then further processed and matched with stored hand shapes to recognize hand signs represented by the image pixels representing the hands and arms. The trajectory of the hands and arms may also be tracked to determine gestures and sign language represented by motions and shapes of the hands in a sequence of images. The conventional techniques using the depth images are advantageous compared to the techniques requiring markers, specific colors, backgrounds or gloves because it is more convenient to implement in uncontrolled real-life environment. Further, the conventional techniques using depth images also have the advantage that additional equipments or devices need not be provided to a person communicating via the sign language or installed around that person.

Conventional hand sign recognition systems using the depth images, however, may recognize hand signs that only involve one hand or two hands that do not adjoin or overlap. The depth images are generally gray-scale images with image pixels indicating the distance between the cameras and a target subject. In such depth images, ambiguity as to which image pixels represent which objects (e.g., hands) arises when two or more objects (e.g., hands) overlap or adjoin in the depth images.

For example, FIGS. 1A to 1C illustrate three examples from Japanese Sign Language (JSL) that involve overlapping or adjoining hands. FIG. 1A illustrates a sign which means a "letter," FIG. 1B illustrates a sign which means "well," and FIG. 1C illustrates a sign that means "fit" in JSL. In conventional sign recognition systems using the depth images, such overlapping or adjoining hand shapes and motions may not be recognized or identified because conventional sign recognition systems do not have the capability to separate image pixels representing one hand from the other when the hands are overlapped. Therefore, conventional sign recognition systems using depth images can recognize only a portion of signs that are generally used in sign language.

SUMMARY OF THE INVENTION

An embodiment of the present invention provides a method and system for recognizing hand signs including overlapping or adjoining hands. The sign recognition system receives a depth image of a target subject and extracts portions of the depth image representing the hands of the target subject. The sign recognition system classifies the depth image into a first portion representing a first hand of the target subject and a second portion representing a second hand of the target subject when it is determined that the hands in the depth image overlap or adjoin.

In one embodiment, the sign recognition system generates a linked structure representing a first hand and a second hand. Segments of the linked structure are then classified to a first set of segments for the first hand and a second set of segments for the second hand. The first and second sets of segments are then matched with stored shapes of hands to determine a sign represented by the first hand and the second.

In one embodiment of the present invention, the segments of the linked structure are classified into the first hand and the second hand using constrained optimization technique. A cost function representing a cost for classifying a set of segments to the first hand and another set of segments to the second hand is generated. Constraint conditions associated with the physical structure or characteristics of hands are generated. The constraint conditions, for example, include a condition that segments located close to each other are likely to be classified to the same hand. Using the cost function and the constraint conditions, the sign recognition system according to the embodiment converts the sign recognition to a labeling problem. The sign recognition system then classifies the segments of the linked structure to the first hand and the second hand.

In one embodiment of the present invention, the segments of the linked structure are classified into the first hand and the second hand using a tree search technique. The tree search technique includes generating a directed acyclic graph structure having nodes (representing segments) based on the linked structure and indicating connective relationships between the nodes. The nodes are classified to a first set of nodes assigned to the first hand, and a second set of nodes assigned to the second hand. Various combinations of nodes are evaluated using one or more criteria.

In one embodiment of the present invention, a first palm of the first hand and a second palm of the second hand are detected. The first palm and the second palm may be detected by first generating a skeleton line of image pixels representing the first or the second hand. Candidate lines that may include a center of the first palm or the second palm are then obtained by measuring the widths of lines perpendicular to the skeleton line between the edges of image pixels outlining the first hand or the second hand. The candidate line closest to fingers may then be selected as the line that includes the center of the first palm or the second palm.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 3A illustrates a block diagram of a shape matching module according to one embodiment of the present invention.

FIG. 3B illustrates a block diagram of a shape matching module according to one embodiment of the present invention.

DETAILED DESCRIPTION OF THE EMBODIMENTS

Figure 1A:
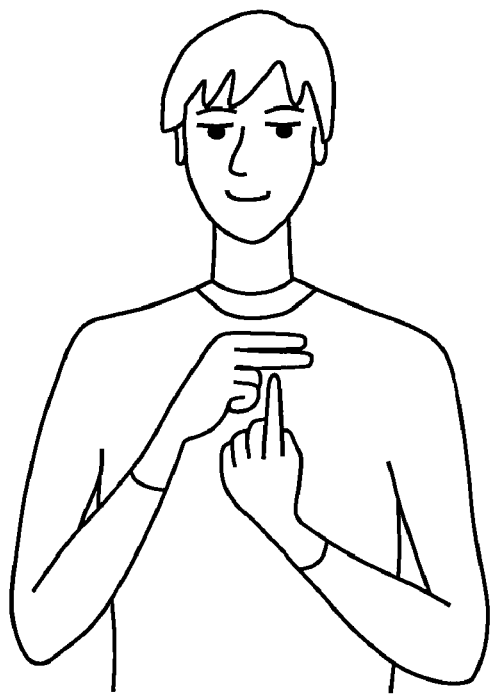
FIGS. 1A-1C illustrate signs in Japanese Sign Language that include overlapping or adjoining hands.
Figure 1B:
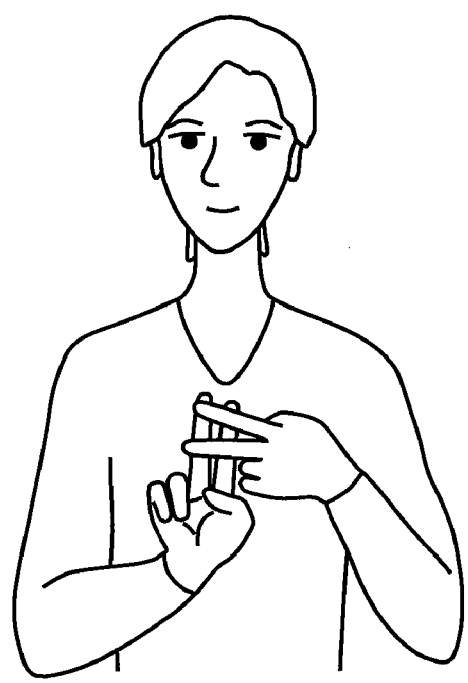
Figure 1C:
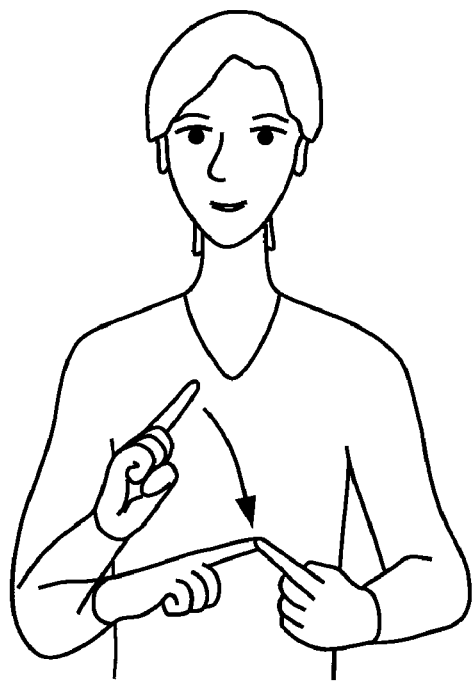

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

One embodiment for recognizing hand signs increases the number of signs that can be recognized or identified by a sign recognition system. Specifically, the sign recognition system determines shapes of both hands in a depth image even when the hands overlap or adjoin. The hand pose of the overlapping or adjoining hands may be determined using (i) a constrained optimization method in which a cost function and constraint conditions are used to convert the problem of classifying segments of the linked structure to a labeling problem in the form of a linear programming optimization problem or (ii) a tree search method in which a directed acyclic graph including a plurality of nodes is used to obtain the most-likely pose of the hands represented by the depth image. After determining the shapes of both hands, the segments of the linked structure are matched with stored hand shapes to determine the sign represented by the depth image.

A linked structure herein refers to a set of linked lines derived from image pixels that may be used to determine the pose of overlapping or adjoining hands. The linked structure includes more than one segment that represents features of hands in a depth image. The linked structure is, for example, obtained by performing a thinning operation on clusters of image pixels representing overlapping or adjoining hands, and then processed further to identify or recognize the hand shapes. By using the linked structure, the computation and algorithm associated with recognizing the signs of the sign language can be simplified because image pixels do not need to be addressed to recognize or identify the signs.

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Structure of Sign Recognition System

Figure 2:
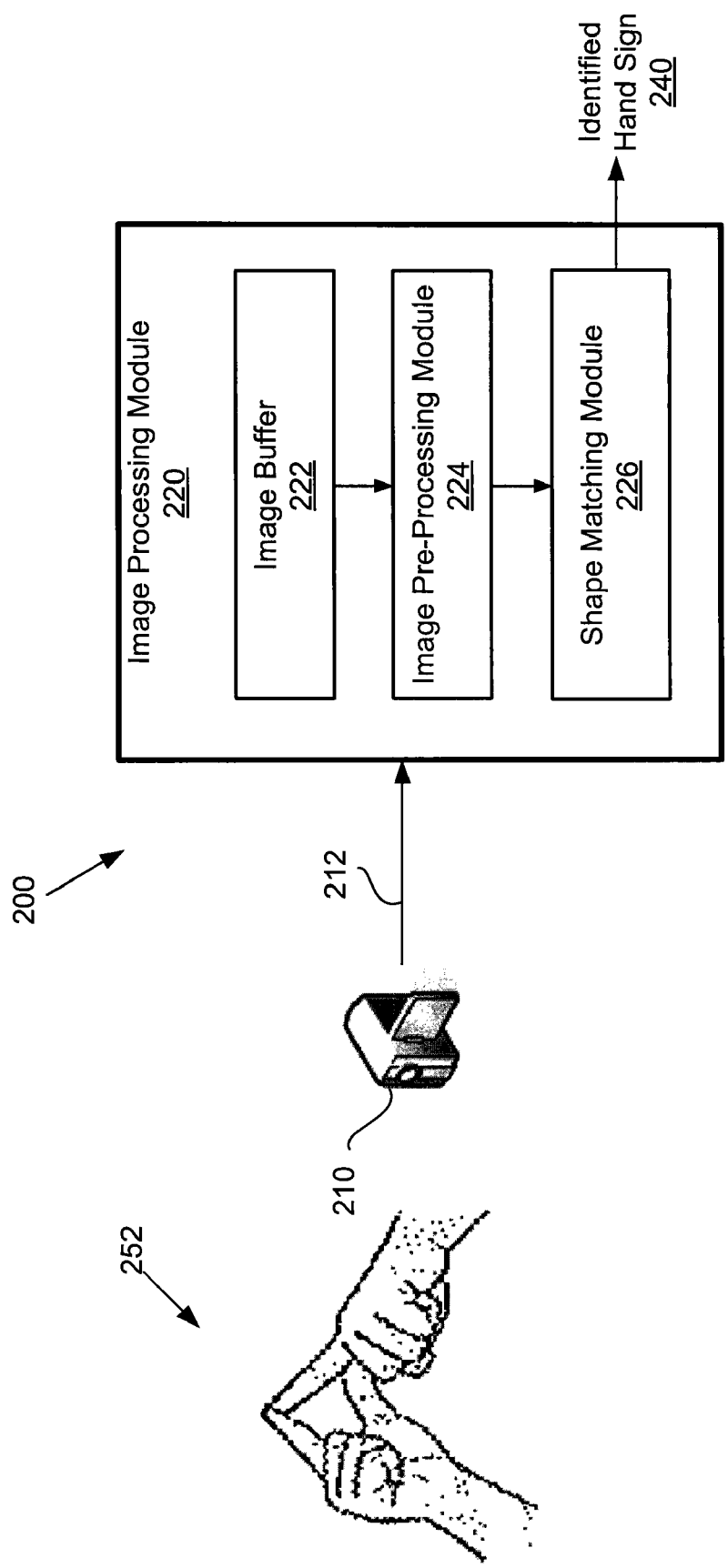
FIG. 2 illustrates a schematic block diagram of a sign recognition system according to one embodiment of the present invention.

FIG. 2 illustrates a schematic block diagram of a sign recognition system 200, according to one embodiment of the present invention. The sign recognition system 200 includes, among other components, an image capturing device 210 and an image processing module 220. The image capturing device 210 captures a depth image 212 of a target subject 252 and transmits the depth image 212 to the image processing module 220. The image processing module 220 processes the depth image 212 and outputs data 240 representing the identified hand sign presented by the target subject 252.

In one embodiment, the image capturing device 210 includes a time-of-flight sensor providing a resolution sufficient for a hand shape analysis such as, for example, a camera manufactured by CSEM SA of Zurich, Switzerland; 3DV Systems of Yokneam, Israel; or Canesta, Inc. of San Jose, Calif. The time-of-flight sensor is set to a depth window that includes the area within which the target subject is expected to move about. Non-target subjects such as background objects are not part of the depth image 212. In another embodiment, the image capturing device 210 includes stereo vision cameras for generating the depth image 212 based on two or more image sensors separated by a distance. Coded lights or space-time stereo images may also be used to generate the depth image 212.

The image processing module 220 may be a device dedicated to recognizing hand signs from the depth image 212. Alternatively, the image processing module 220 may be a part of a general purpose computing device such as a personal computer. The image processing module 220 may include, among other components, conventional data processing and storage devices, such as computer processors and computer readable storage media, including RAM, ROM, flash memory, disk drives, and the like. Preferably, the computer processors are conventional multi-purpose processors capable of implementing image processing functions when executing program instructions derived from executable software programs. In one embodiment, the image processing module 220 includes a computer readable media (not shown) from which one or more computer programs may be accessed to recognize gesture features and effectuate related changes in a display device (not shown).

In one embodiment, the sign recognition system 200 is a part of a robotic man-machine interaction system used, for example, in ASIMO advanced humanoid robot of Honda Motor Co., Ltd., Tokyo, Japan. In this embodiment, the image capturing device 210 may be part of a robotic vision unit and the image processing module 220 may be part of the robot's control logic. The sign recognition system 200 in the robotic man-machine interaction system may be used, for example, to command the robot in a noisy environment in which speech or voice commands is unlikely to be effective.

The image processing module 220 is coupled to the image capturing device 210 to receive the depth image 212. The image processing module 220 includes, among other components, an image buffer 222, an image pre-processing module 224, and a shape matching module 226. The image buffer 222 is configured to receive the depth image 212 from the image capturing device 210. The input buffer 222 may be part of peripheral interface hardware, network interface hardware (wired or wireless) or the like. In one embodiment, the depth image 212 received through the input buffer 222 is stored in an internal data storage device (not shown) such as a hard disk, flash, RAM, or the like.

The image pre-processing module 224 performs various image processing operations including, among others, motion tracking and extracting clusters of image pixels representing certain parts of the target subject 252 as disclosed, for example, in U.S. patent application Ser. No. 11/129,164 titled "Sign Based Human-Machine Interaction" filed on May 12, 2005 and published as U.S. Patent Application Publication No. 2005/0271279, and U.S. patent application Ser. No. 11/869,435 titled "Human Pose Estimation and Tracking Using Label Assignment" filed on Oct. 9, 2007, which are incorporated by reference herein in their entirety. With respect to the sign recognition, the image pre-processing module 224 performs, among other operations, extracting of clusters of image pixels representing hands, detecting the palms of the hands, and generating the linked structure, as explained below in detail with reference to FIG. 4.

The shape matching module 226 is coupled to the image pre-processing module 224 to receive the linked structure and information regarding the locations of palms of both hands. The shape matching module 226 then determines which segments of the linked structure should be assigned to which hands, and matches the determined hand shape with stored hand shapes to determine the hand shape presented by the target subject 252. By determining which segments of the linked structure should be assigned to which hands, determination can also be made as to which image pixels should be assigned to which hands. In one embodiment, the image pixels are assigned to the same hand as nearby segments.

FIGS. 3A and 3B illustrate block diagrams of the shape matching module 226, according to embodiments of the present invention. In the embodiment of FIG. 3A, the shape matching module 226A includes an overlapping shape detection module 316, a non-overlapping shape matching module 320, a constrained optimization module 340, and a shape database 350. The overlapping shape detection module 316 determines if the depth image 212 includes image pixels representing two hands that overlap or adjoin.

If the overlapping shape detection module 316 determines that the hands in the depth image 212 are not overlapping or adjoining, the non-overlapping hand shape matching module 320 is used to recognize the hand signs as disclosed, for example, in U.S. patent application Ser. No. 11/129,164 titled "Sign Based Human-Machine Interaction" (U.S. Patent Application Publication No. 2005/0271279), which is incorporated by reference herein in its entirety. On the other hand, if it is determined that the hands in the depth image 212 are overlapping or adjoining, the constrained optimization module 340 is used to determine the hand shapes and to determine the signs represented by the hand shapes, as described below in detail with reference to FIGS. 8-10.

The shape database 350 stores a set of hand shape profiles for matching with the hand shape as determined by the non-overlapping hand shape matching module 320 or the constrained optimization module 340, as described, for example, in U.S. patent application Ser. No. 11/129,164 titled "Sign Based Human-Machine Interaction" (published as U.S. Patent Application Publication No. 2005/0271279), which is incorporated by reference herein in its entirety.

The embodiment of FIG. 3B is substantially the same as the embodiment of FIG. 3A except that a tree search module 344 is provided in lieu of the constrained optimization module 340. The functions of the overlapping shape detection module 316, the non-overlapping shape matching module 320, and the shape database 350 in the embodiment of FIG. 3B are essentially the same as the embodiment of FIG. 3A. In the embodiment of FIG. 3B, however, the tree search module 344 uses the directed acyclic graph to determine the hand shapes, as described below in detail with reference to FIGS. 9-11. The shape matching modules 226A and 226B of FIGS. 3A and 3B are hereinafter collectively referred to as the shape matching module 226.

Method of Recognizing Hand Signs

Figure 4:
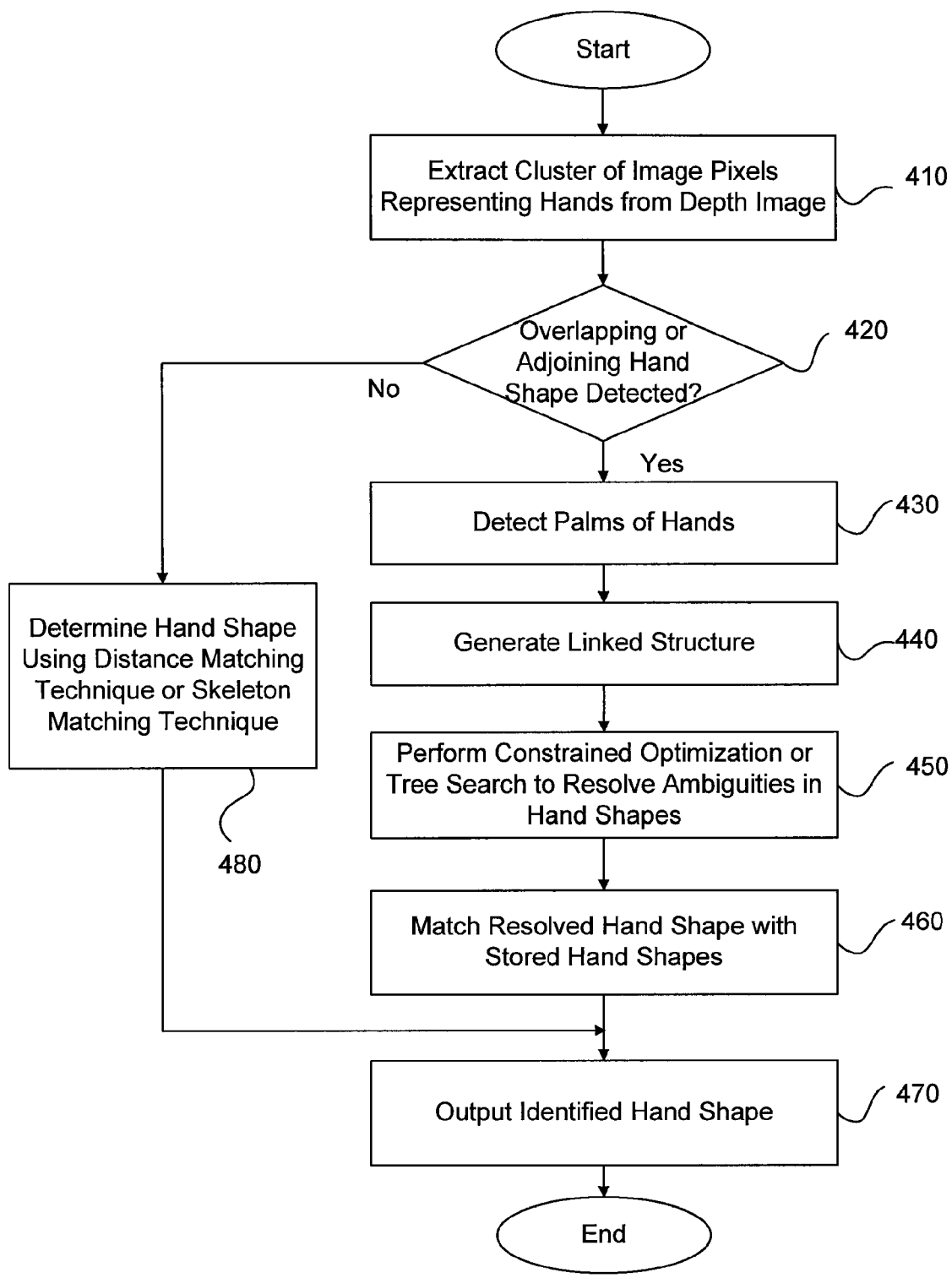
FIG. 4 illustrates a flowchart of a method for recognizing hand signs, according to one embodiment of the present invention.

FIG. 4 illustrates a flowchart of a method for recognizing the hand signs, according to one embodiment of the present invention. First, the image pre-processing module 224 extracts 410 the cluster of image pixels representing hands from the depth image 212. The cluster of image pixels representing hands can be determined, for example, by classifying and labeling portions of the depth image and color image to different parts of the target subject, as disclosed in U.S. patent application Ser. No. 11/869,435 titled "Human Pose Estimation and Tracking Using Label Assignment" filed on Oct. 9, 2007, which is incorporated by reference herein in its entirety. Then the image pre-processing module 224 determines 420 whether the extracted clusters of image pixels include hands that are overlapping or adjoining.

If it is determined that the hands in the clusters of image pixels are overlapping or adjoining, then the pre-processing module 224 detects palms of hands, as described below in detail with reference to FIGS. 5 and 6. Then the pre-processing module 224 generates 440 a linked structure (refer to FIG. 7C), for example, by performing a medial axis transform on the cluster of image pixels representing the hands. In one embodiment, the medial axis transform is performed by applying a thinning operation on the cluster. The linked structure generated by the pre-processing module 224 approximates the skeleton of the cluster of the image pixels.

Then the shape matching module 226 performs 450 constrained optimization or tree search to resolve ambiguities in the hand pose, as describe below in detail with reference to FIGS. 8 and 10. The ambiguities in the hand shapes are resolved by assigning the segments of the linked structure or nodes to one hand or the other.

After assigning the segments of the linked structure or nodes to one hand or the other using the constrained optimization or tree search, the shape matching module 226 matches 470 the hand pose resolved in step 450 with profiles of hand shapes stored in the shape database 350 as disclosed, for example, in U.S. patent application Ser. No. 11/129,164 titled "Sign Based Human-Machine Interaction" filed on May 12, 2005 (published as U.S. Patent Application Publication No. 2005/0271279), which is incorporated by reference herein in its entirety. Then the shape matching module 226 outputs 470 the hand sign 240 identified by matching the hand shape in the depth image 212 with the stored profiles of hand shapes, and terminates the process.

If it is determined in step 420 that there are no overlapping or adjoining hands in the depth image 212, the process proceeds to determine 480 the shapes of the hands in the depth image 212 using a distance matching technique or a skeleton matching technique as disclosed, for example, in U.S. patent application Ser. No. 11/129,164 titled "Sign Based Human-Machine Interaction" filed on May 12, 2005 (published as U.S. Patent Application Publication No. 2005/0271279), which is incorporated by reference herein in its entirety. Then the process proceeds to output 480 the identified hand sign and terminates the process.

Palm Detection

Figure 5:
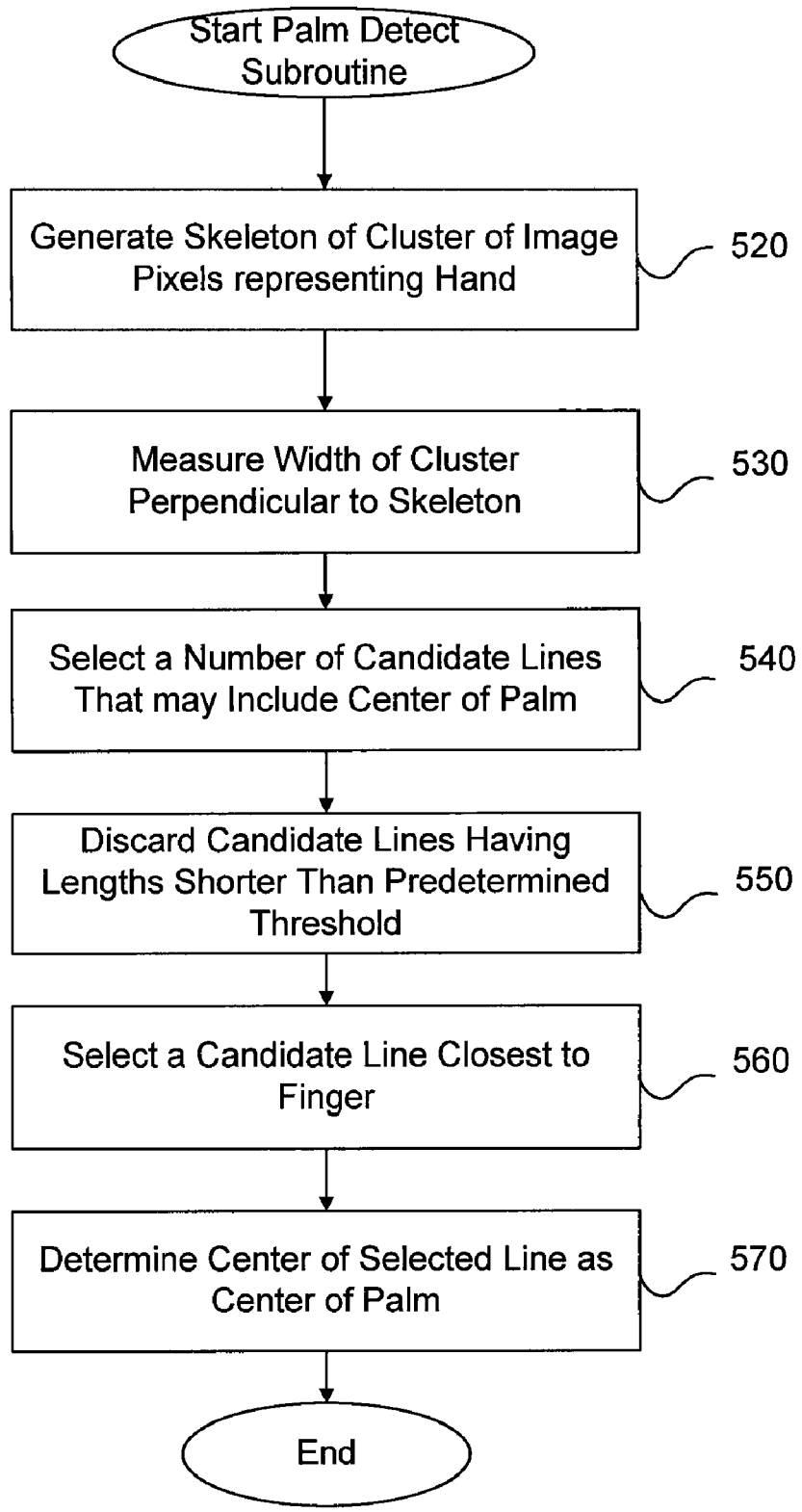
FIG. 5 illustrates a flowchart of a method for detecting a palm of a hand, according to one embodiment of the present invention.
Figure 6:
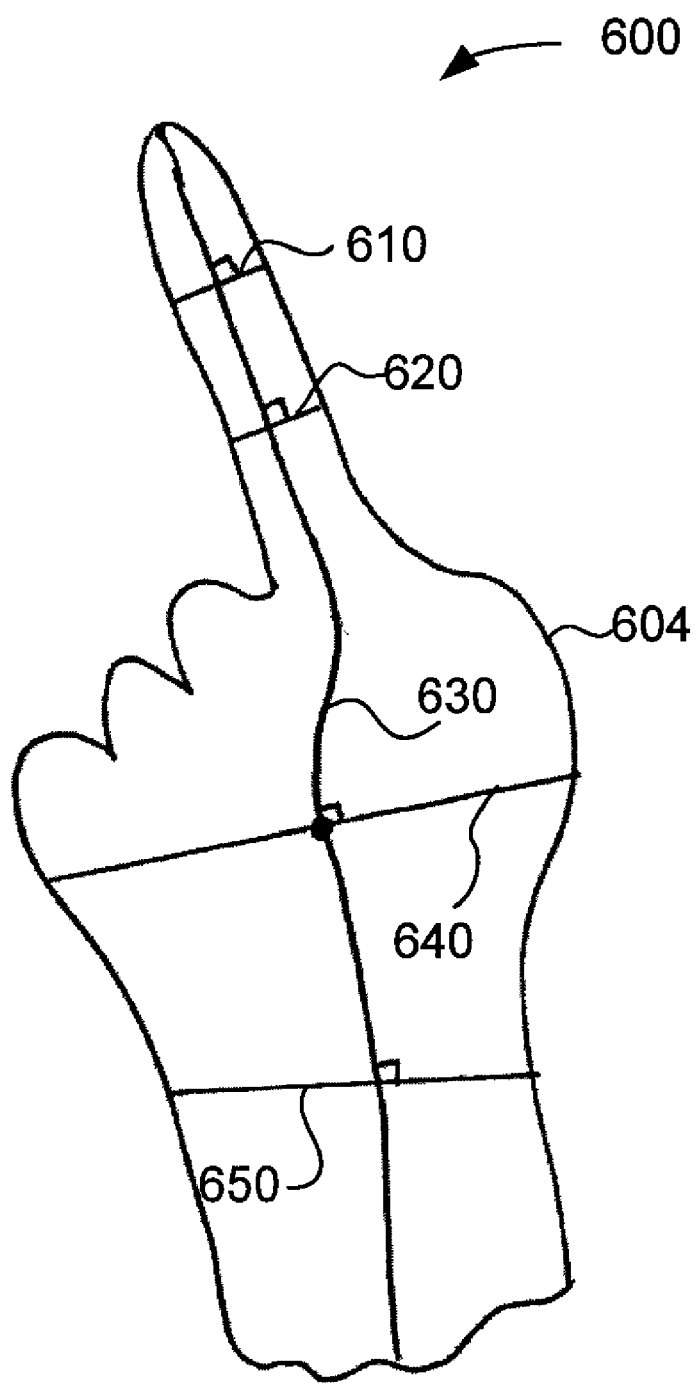
FIG. 6 illustrates an image of a hand for detecting its palm, according to one embodiment of the present invention.

FIG. 5 illustrates a flowchart of a method for detecting a palm of a hand, according to one embodiment of the present invention. Determining the location of the palms is important because the accuracy of the tree search method and constrained optimization method depends largely on correct detection of the palms. Both the tree search method and constrained optimization method rely partly on the relative distance to the palms or whether the segments are linked to the palms to classify the segments (and thereby, classify the image pixels) to one hand or the other. Therefore, incorrect detection of the locations of the palms can result in inaccurate classification of segments to the hands.

First, a skeleton of the cluster of image pixels 600 representing the hand (and possible some part of the forearm) is generated 520 using conventional methods. Referring to FIG. 6, a line 630 representing the skeleton of a cluster of image pixels 600 is illustrated. Then the widths of the cluster perpendicular to the line 630 (i.e., skeleton) are measured 530. The widths of the clusters are determined by measuring the distance between two points where the lines perpendicular to the line 630 intersect with a line 604 outlining the hand. Referring to FIG. 6 as an example, the widths of the cluster 600 are measured by perpendicular lines (for example, lines 610, 620, 640 and 650) while moving along the line 630. Then a number of perpendicular lines (lines 610, 620, 640, and 650) having lengths (i.e., widths of the cluster) that are local maximums are selected as candidate lines that may include the center of the palm.

Referring back to FIG. 5, the candidate lines having lengths shorter than a threshold are then discarded 550. The short candidate lines are discarded because these are likely to represent fingers, not the palm. The lines 610 and 620 of FIG. 6, for example, are discarded at this stage.

Among the remaining candidate lines (for example, line 640 and 650), the candidate line 640 closest to fingers is selected 560 as the line that includes the center of the palm. In one embodiment, the fingers are detected from lines in skeleton where the clusters around the lines are thinner than other lines of the same skeleton. After the line 640 is selected as the line including the center of the palm, the center of the line 640 is determined 570 as the center of the palm. In one embodiment, the shape of the palm is then determined by choosing a circle or an ellipse with maximum radius or axis that fits within the cluster.

Example of Linked Structure

Figure 7A:
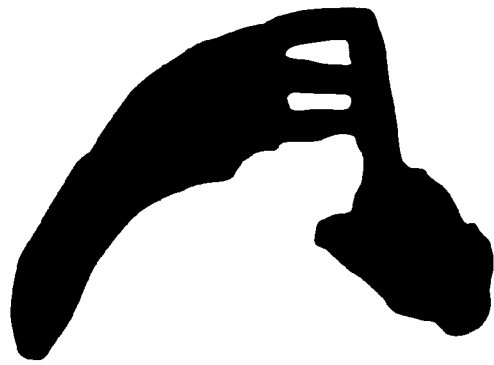
FIG. 7A illustrates an example of a depth image for processing by a sign recognizing system according to one embodiment of the present invention.

FIG. 7A illustrates a depth image including a sign that is to be processed by a sign recognizing system 200 according to one embodiment of the present invention. FIG. 7A is a depth image extracted from an image of the target subject presenting letter "B" in Japanese Sign Language (JSN). Background of the image and other artifacts in the depth image of FIG. 7A was removed by the image pre-processing module 224.

Figure 7B:
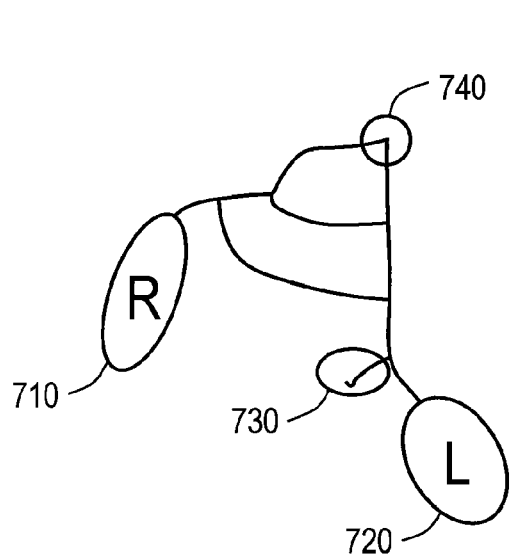
FIG. 7B illustrates a skeleton structure generated from the depth image of FIG. 7A, according to one embodiment of the present invention.

FIG. 7B illustrates a skeleton structure generated from the depth image of FIG. 7A, according to one embodiment of the present invention. A right hand palm 710 and a left hand palm 720 are detected using the method, for example, as described above with reference to FIGS. 5 and 6. The skeleton structure of FIG. 7B are not yet segmented into multiple segments. The skeleton structure of FIG. 7B may include short fragments (for example, dangling line 730) that are unlikely to be features of the hands. Such short fragments are likely to be the result of noise in the digital image or other artifacts added during the image processing.

Figure 7C:
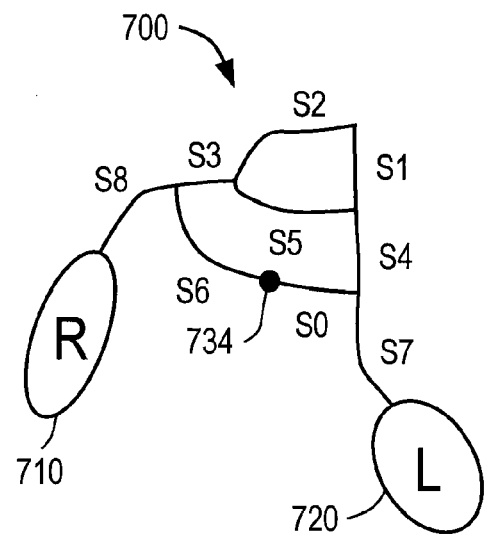
FIG. 7C illustrates a linked structure generated from the skeleton structure of FIG. 7B, according to one embodiment of the present invention.

FIG. 7C illustrates the linked structure 700 generated from FIG. 7B, according to one embodiment of the present invention. The linked structure 700 is different from the skeleton structure in that the linked structure 700 is segmented into multiple segments (S0-S8) at multiple nodes. Also, the linked structure 700 does not include the short fragments such as the dangling line 730 of FIG. 7B. To generate the linked structure 700, the skeleton structure may be segmented at following nodes: (i) branching nodes where three or more lines meet because these nodes are likely to be points where fingers start, adjoin, or terminate, (ii) at the point where the change of angles in the line is abrupt (for example, point 740 of FIG. 7C) because fingers or other parts of the hands are likely to intersect at this point, and (iii) at a point where a maximum curvature change occurs in a line of length longer than a predetermined threshold (for example, point 734 of FIG. 7D) because a segment in a hand is unlikely to have a length extending over the threshold.

Constrained Optimization Method

Figure 8:
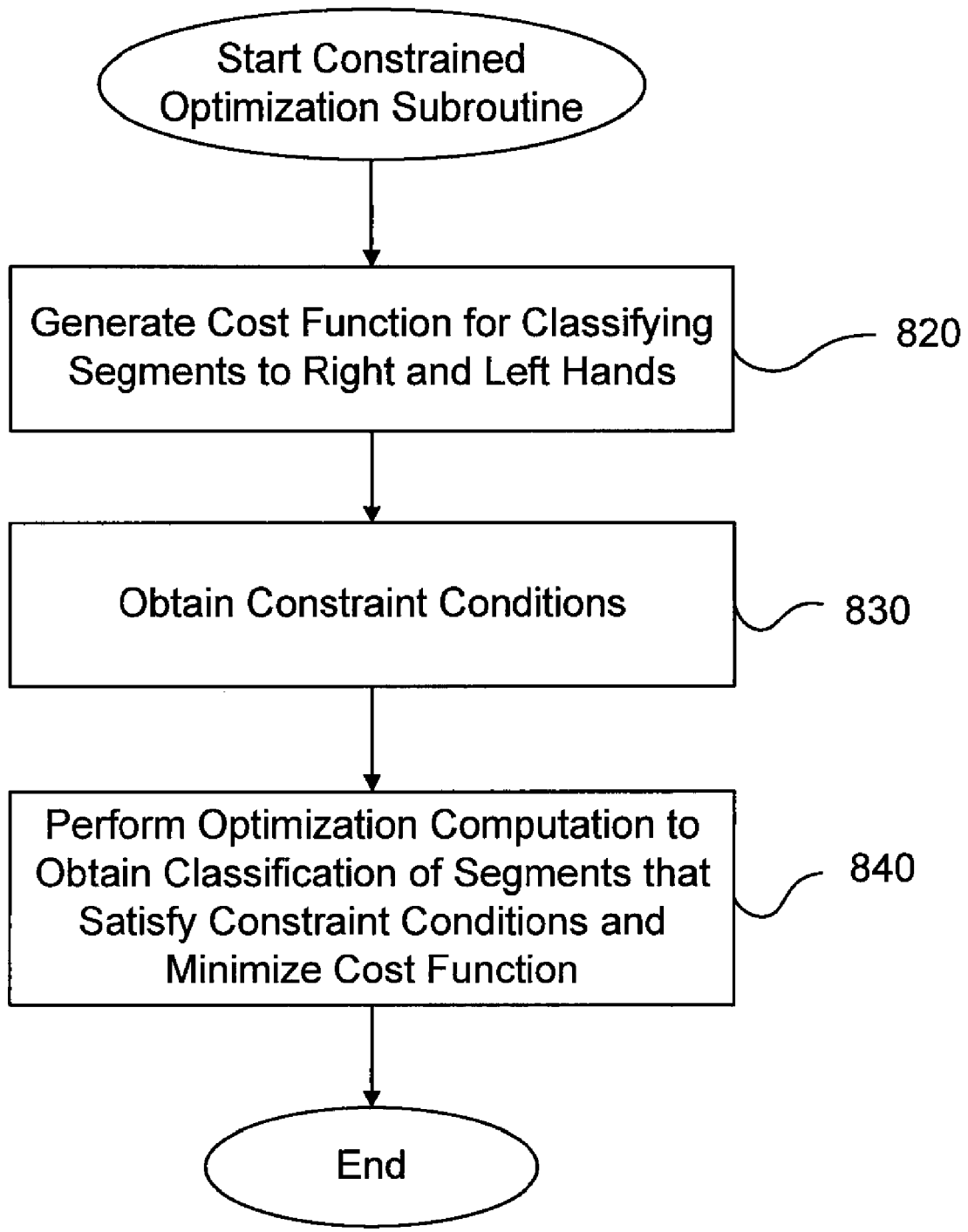
FIG. 8 illustrates a method of classifying segments of a linked structure using a constrained optimization method, according to one embodiment of the present invention.

FIG. 8 illustrates a method of grouping the segments of the linked structure using the constrained optimization method, according to one embodiment of the present invention. The constrained optimization module 340 first generates a cost function for classifying segments of the linked structure to the right hand or the left hand. In one embodiment the following cost function Q(f) is used.

$$Q(f) = \sum_{i=1}^{N} \sum_{j=1}^{M} c(i, j)A_{ij} + \sum_{e \in E} w_e Z_e \quad \text{Equation (1)}$$

where N is the number of total segments in the linked structure, M is the number of hands (i.e., M=2), c(i, j) represents the cost for assigning segment $s_i$ to hand j (j=1 for the left hand and j=2 for the right hand, or vice versa), $A_{ij}$ are parameters having values of either 0 or 1 representing whether segment $s_i$ is assigned to the right hand or the left hand (as tabulated into an association table shown below in Table 1), $w_e$ represents a weight representing the depth difference between two adjacent segments, and $Z_e$ is a parameter introduced to convert the problem of classifying segments into labeling problem. The overall objective of the optimization process is to find a set of $A_{ij}$ that minimizes the cost function Q(f).

The weight $w_e$ of equation (1) represents the strength of the relationship between the segments $s_i$ (i=1, 2, . . . , N). Segments adjacent to each other have strong relationship and are likely to be classified as the same labeled parts. Such strong relationship will be represented by a higher weight $w_e$. In contrast, segments not adjacent to each other have weak relationship. Such weak relationship is represented by a lower weight $w_e$. Associated with weight $w_e$ is parameter $Z_e$ which is introduced to convert the problem of classifying segments to a labeling problem in the form of a linear programming optimization problem.

TABLE 1

| Segment | Hand (j) | |
| --- | --- | --- |
|  | 1(Right) | 2(Left) |
| $S_1$ | $A_{11}$ | $A_{12}$ |
| $S_2$ | $A_{21}$ | $A_{22}$ |
| ... | ... | ... |
| $S_N$ | $A_{N1}$ | $A_{N2}$ |

In one embodiment, the problem of minimizing Q(f) is subject to the following constraint conditions:

$$\sum_j A_{ij} = 1, (i = 1, 2, 3 \ldots N), \quad \text{Equation (2)}$$

if the $i^{th}$ segment is thin $$\sum_j A_{ij} = 2, (i = 1, 2, 3 \ldots N), \quad \text{Equation (3)}$$

if the $i^{th}$ segment is thick $$Z_e = \frac{1}{2} \sum_j Z_{ej}, e \in E \quad \text{Equation (4)}$$

$$Z_{ej} \geq A_{pj} - A_{qj}; e = (p, q); (j = 1 \text{ or } 2) \quad \text{Equation (5)}$$

$$Z_{ej} \geq A_{qj} - A_{pj}; e = (p, q); (j = 1 \text{ or } 2) \quad \text{Equation (6)}$$

$$A_{ij} \in \{0, 1\}; i = 1, 2, 3 \ldots, N; (j = 1 \text{ or } 2) \quad \text{Equation (7)}$$

$$\sum \text{length}(S_i) A_{ij} < \text{Max (for } j = 1) \quad \text{Equation (8)}$$

-continued $$\sum \text{length}(S_i)A_{ij} < \text{Max (for } j = 2) \qquad \text{Equation (9)}$$

Equation (2) represents a constraint condition that a segment having surrounding clusters with a thin width includes only one finger. Therefore, such segment may be classified to the left hand or the right hand but not both. Equation (3) represents a constraint condition that a segment having clusters with a thick width includes two fingers. Therefore, such segment may be classified to the left hand, the right hand, or both hands.

Equations (4) to (6) (where $Z_{ej}$ represent the absolute value $|A_{pj}-A_{qj}|$) are derived from the constraint condition that neighboring segments should be classified to the same or nearby labeled parts. Equation (7) represents the constraint condition that $A_{ij}$ is either 0 or 1, as described above. Equations (8) and (9) represent the constraint condition that the total length of the fingers in the right hand or the left hand should not exceed a maximum value.

The optimization problem presented by equations (1) to (9) is an integer program which is NP-hard. In one embodiment, the optimization problem is simplified to a linear programming by allowing $A_{ij}$ to have non-integer values. Using such a simplification, the optimization problem presented by equations (1) to (9) can be solved efficiently by using publicly available software libraries such as lp_solve 5.5.0.10 (available, for example, at http://lpsolve.sourceforge.net/5.5/).

In one embodiment, the weight $w_e$ in equation (1) is disregarded ($w_e$ is set to zero) and additional constraint conditions to exclude the cases of fingers bending at extreme angles are used instead. Such constraint condition, for example, can be presented by the following equations (10) and (11) for adjacent segments $S_a$ and $S_b$ (where $1 \leq a \leq N$, and $1 \leq b \leq N$) intersecting at angles less than a threshold (for example, 160 degrees). Equations (10) and 11) represent that the segments $S_a$ and $S_b$ must be classified to different hands.

$$A_{a1}+A_{b1}=1 \qquad \text{Equation (10)}$$

$$A_{a2}+A_{b2}=1 \qquad \text{Equation (11)}$$

The problem of minimizing equation (1) with the weight we set to zero under the constraint conditions represented by equations (2), (3), (5) to (11) may also be solved by using publicly available software libraries such as lp_solve 5.5.0.10.

In one embodiment, the image pixels of the depth image 212 are assigned to the same hand to which a nearby segment is assigned after all the segments are assigned to the right hand, the left hand or both hands.

Tree Search Method

Figure 9:
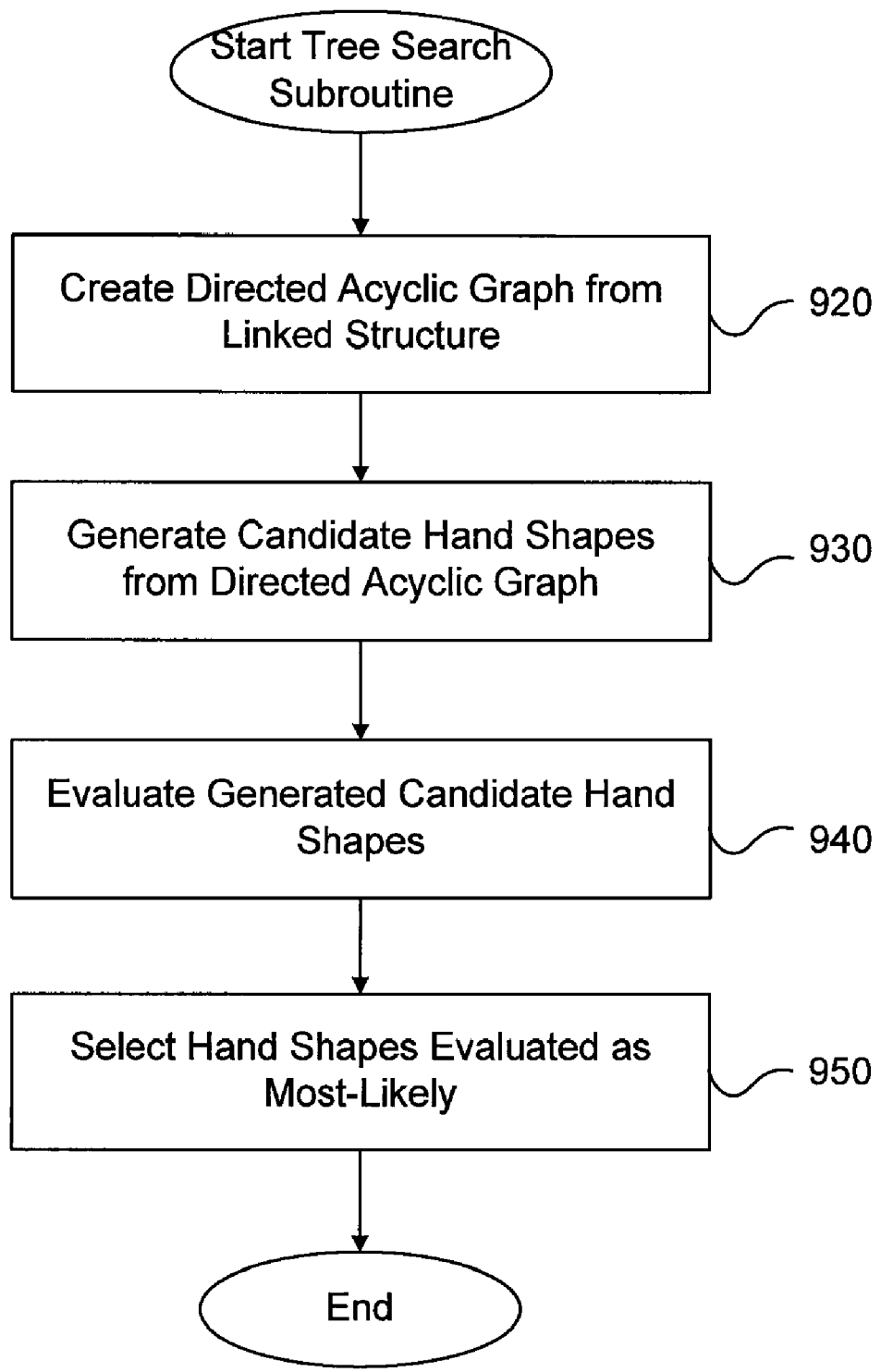
FIG. 9 illustrates a flowchart for a method of classifying segments of a linked structure using a tree search method, according to one embodiment of the present invention.
Figure 11:
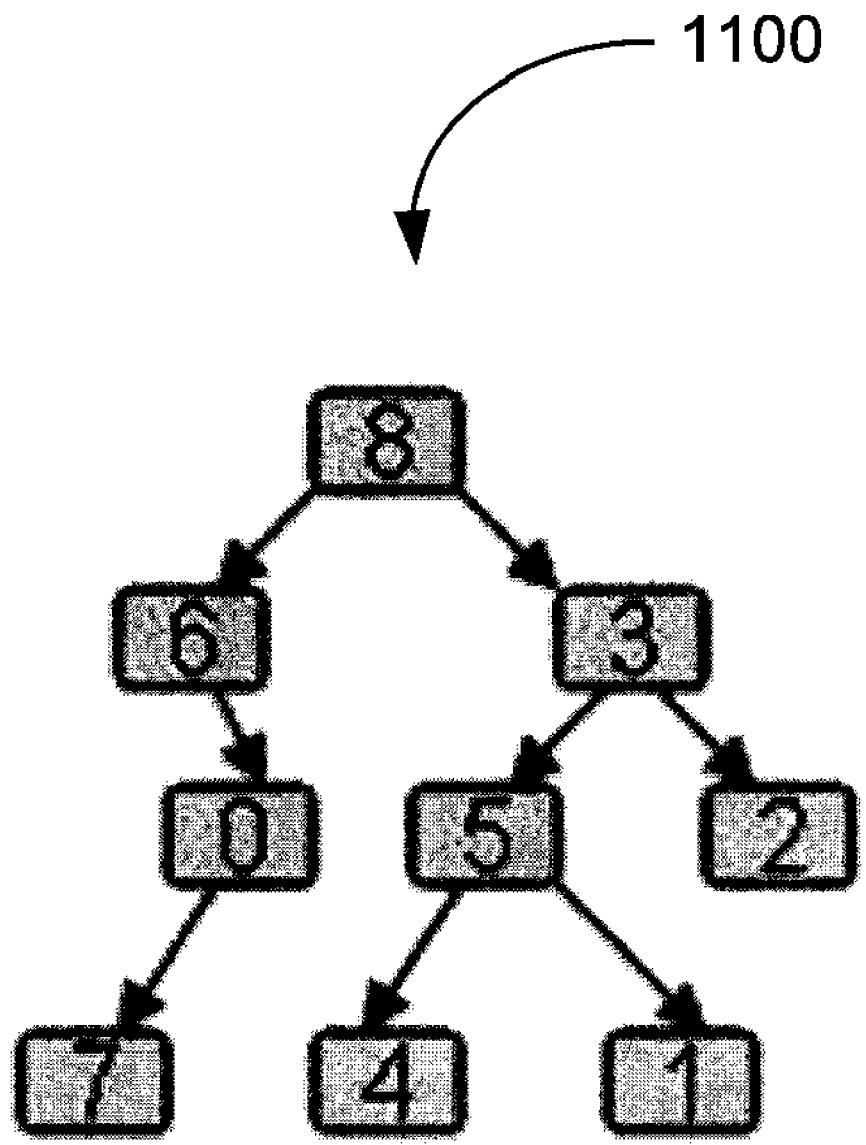
FIG. 11 illustrates a tree structure with nodes generated from the linked structure of FIG. 7C, according to one embodiment of the present invention.

FIG. 9 illustrates a flowchart for a method of classifying the segments of a linked structure to two hands using the tree search method, according to one embodiment of the present invention. First, a directed acyclic graph is generated 920 from the linked structure 700 using conventional methods. Referring to FIG. 11, the directed acyclic graph generated 1100 from the linked structure of FIG. 7C is organized in the form of a tree (hence, referring to this method as the "tree search method").

Figure 12:
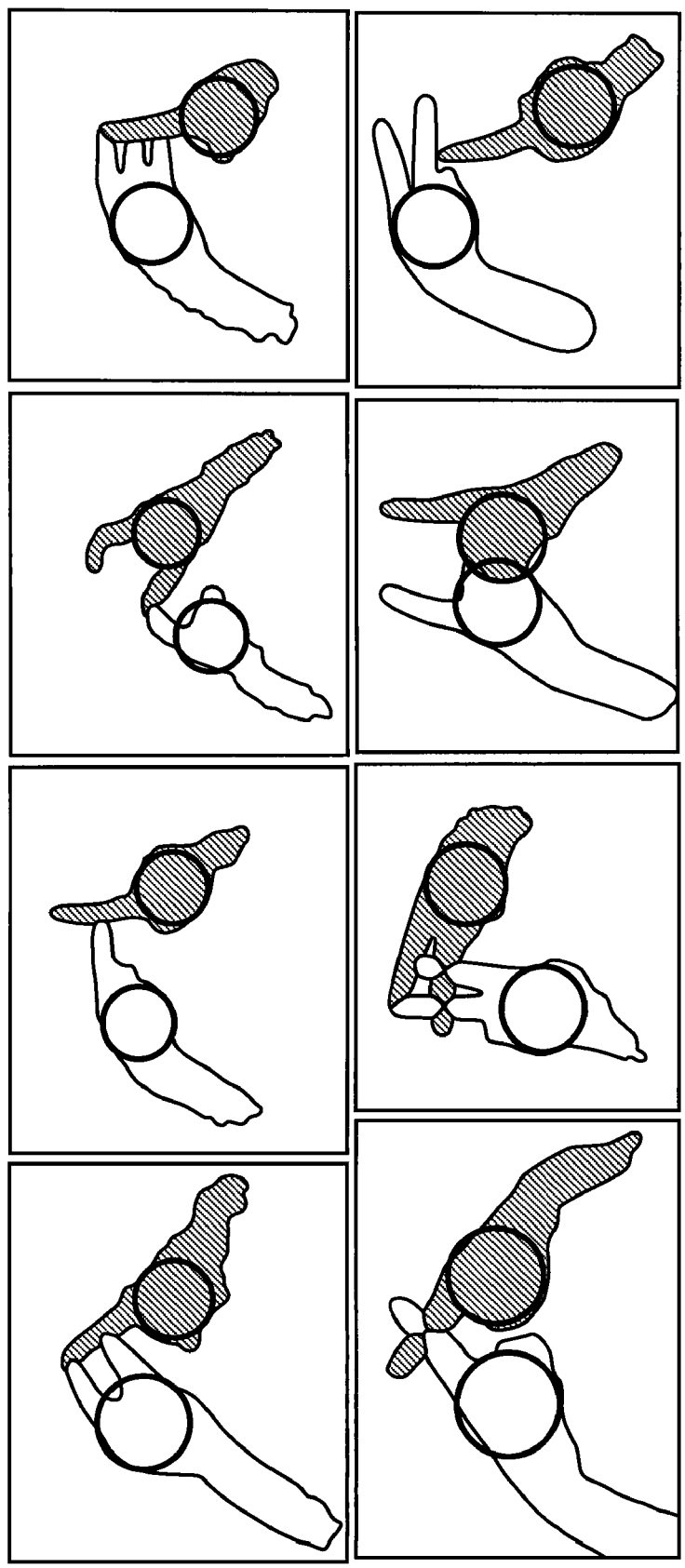
FIG. 12 illustrates examples of image pixels of the depth image classified to a right hand and a right hand, according to one embodiment of the present invention.

In the example of the directed acyclic graph 1100 illustrated in FIG. 12, the top node 8 of the acyclic directed graph starts from the segment S8 (refer to FIG. 7C) closest to the palm 710 of the right hand, and then expands to connected segments as the process proceeds to the left hand palm 720. Arrows in the directed acyclic graph 1100 indicates connective relationship between the nodes. Alternative methods may be used to generate the acyclic directed graph 1100.

Referring back to FIG. 9, after the acyclic directed graph 1100 is generated, the candidate hand shapes for the left hand and the right hand are generated 930, as described below in detail with reference to FIG. 10.

Then the candidate hand shapes are evaluated 940 using one or more criteria. In one embodiment, scores for each of the criteria are calculated and then added to evaluate the candidate hand shapes. The criteria for evaluating the candidate hand shapes include, for example, the following: (i) the candidate hand shapes in which the nodes in the left and right hands are linked are scored higher because hands are physically connected objects, (ii) the candidate hand shapes in which nodes in a hand are within a certain distance from the palm of that hand are scored higher because the fingers are located close to the palm, (iii) the candidate hand shapes having acute angles between the segments are scored lower because the fingers are unlikely to bend at extreme angles, and (iv) the candidate hand shapes in which the branching nodes are located remotely from the palm of the assigned hands are scored lower because the branching nodes are unlikely to start at the fingers (the branching nodes generally start from the palm where multiple fingers are connected). After calculating the scores for the criteria (i) to (iv), they are added to obtain the total score. These criteria are not exclusive or exhaustive, and different criteria may be used to evaluate the candidate hand shapes.

The candidate hand shape with the highest score is chosen as the most-likely hand shapes. Different weights may be given to different scores representing different criteria to more accurately evaluate the combinations.

Figure 10:
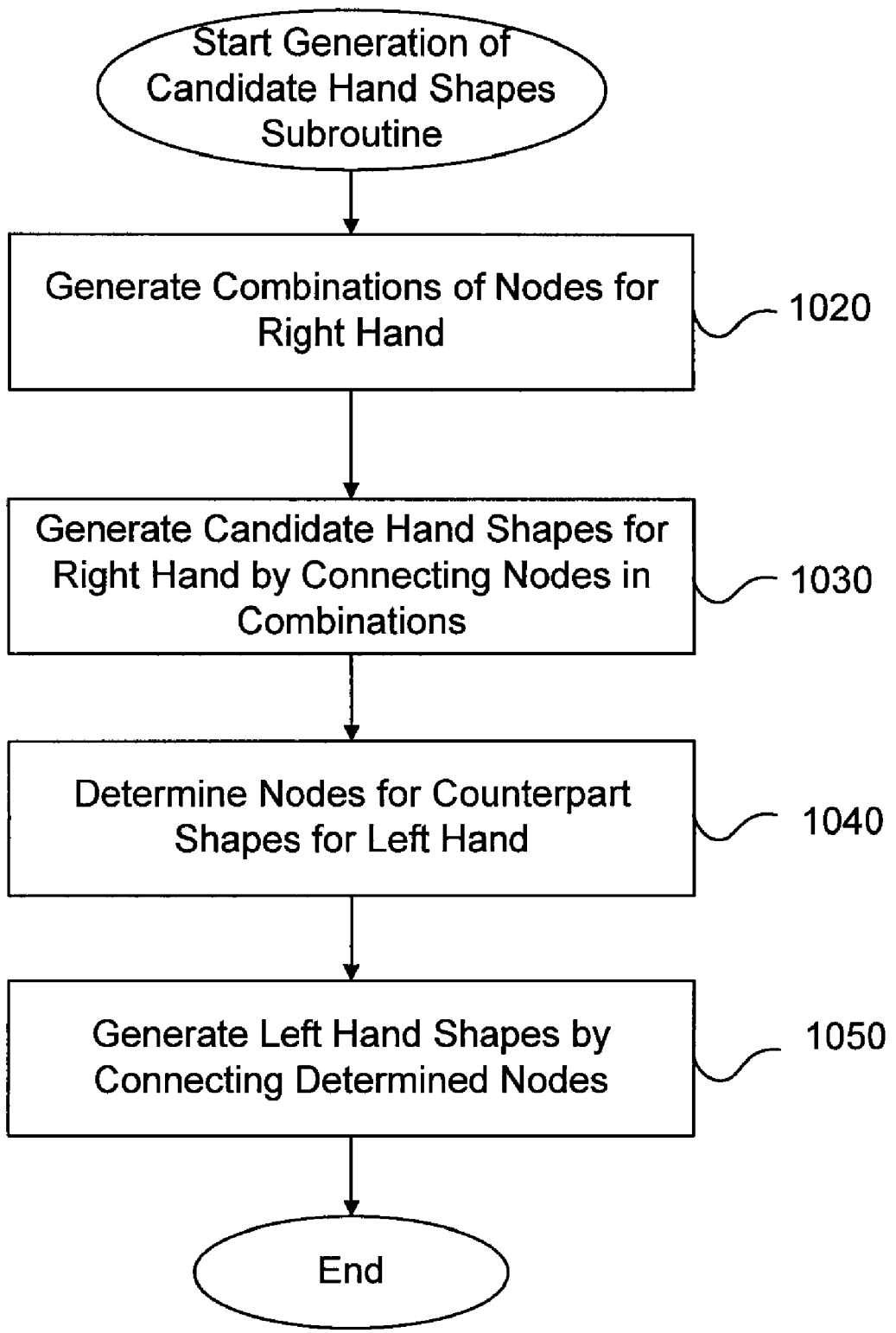
FIG. 10 illustrates a flowchart for a method for generating hand shapes using directed acyclic graph, according to one embodiment of the present invention.

FIG. 10 illustrates a flowchart for generating candidate hand shapes for the left hand and the right hand, according to one embodiment of the present invention. Although it is possible to generate all possible candidate shapes and evaluate all of the candidate shapes, such method is computationally expensive and inefficient because some hand shapes are not practically possible in view of the physical structure of hands as represented by the nodes and segments. Therefore, in one embodiment of the present invention, only candidate hand shapes that satisfy certain connective relationships between nodes are generated for further evaluation at step 940 of FIG. 9.

In this embodiment, after generating the directed acyclic graph 1100 as illustrated in FIG. 11, a top-to-bottom search is performed to generate 1030 combinations of nodes to be assigned to one hand (e.g., the right hand). Specifically, starting from the top node 8 of the directed acyclic graph 1100, it becomes apparent that four sets of node combinations for the right hand are possible: (i) a first candidate hand shape in which only node 8 belongs to the right hand (nodes other than node 8 are assigned to the left hand), (ii) a number of candidate hand shapes in which all or part of nodes in a branch starting from node 6 are classified to the right hand, (iii) a number of candidate hand shapes in which all or part of nodes in a branch starting at node 3 are classified to the right hand, and (iv) a number of candidate hand shapes in which all or part of the nodes in both branches (i.e., the branch starting at node 3 and the branch starting at node 6) are classified to the right hand. After determining the candidate hand shapes based on inclusion of nodes 8, 6, and 3, the process continues the next level to determine whether the candidate shapes include nodes 0, 5, and 2 in the same manner as at node 8. Likewise, it is determined whether the candidate shapes include nodes 7, 4, and 1.

Then all of the candidate hand shapes for the right hand are generated 1030 by connecting the nodes determined to be included in the candidate hand shapes. Then, for each candidate shape for one hand (e.g., the right hand), nodes for a counterpart candidate shape (for the left hand) are determined 1040 by eliminating the nodes in the candidate shapes (for the right hand) from the nodes of the directed acyclic graph 1100. Then the candidate hand shapes for the left hand are generated 1050 by connecting nodes in the counterpart candidate shapes. For example, if a candidate hand shape for the right hand includes nodes 8, 6, 0, and 7, the counterpart candidate shape for the left hand includes nodes 1-5. In this example, the candidate right hand shape is generated by connecting nodes 8, 6, 0, and 7; and the candidate left hand shape is generated by connecting nodes 1-5.

After generating exhaustive combinations of the right hand shapes and the left hand shapes from the directed acyclic graph 1100 that satisfy the connective relationship for the right hand, each combination of hand shapes is evaluated using the scores for the criteria, as describe above with reference to FIG. 9.

Results of Experiment

FIG. 12 illustrates examples of image pixels assigned to both hands, accordingly to embodiments of the present invention. Specifically, the examples of FIG. 12 illustrate the following signs in JSL which were correctly identified using the constrained optimization method: alphabet letter A, alphabet letter K, alphabet letter G, alphabet letter B, alphabet letter X, the word "well," the word "meet," and the word "letter." The circles in each image in FIG. 12 represent the palms of the hands detected using the method describe above in detail with reference to FIG. 5.

For this experiment, the sign recognition system was implemented using a laptop computer having a processor operating at 2.13 GHz Pentium processor, and 2 Gigabytes of RAM. Under such hardware configuration, the sign recognition system produced correct identification of the sign in approximately 0.5 second. Such fast recognition time means that the shape matching modules according to the embodiments of the present invention are computationally inexpensive, and therefore, add only minimal amount of computation cost to overall sign recognition process.

Alternative Embodiments

In one embodiment, the sign recognition system further includes a gesture matching module for tracking trajectory of hands as disclosed, for example, in U.S. patent application Ser. No. 11/129,164 titled "Sign Based Human-Machine Interaction" filed on May 12, 2005 (published as U.S. Patent Application Publication No. 2005/0271279), which is incorporated by reference herein in its entirety. The gesture matching module may be associated with the shape matching module according to the embodiments of the present invention to track motions of overlapping or adjoining hands.

In one embodiment, color image data may be provided to further enhance the accuracy of the hand shape identification. The colors or shades obtained from the color image data may resolve ambiguity in the hand pose that is otherwise difficult to identify correctly using only the depth image. When using the color image data, additional criteria or constraints may be introduced.

In one embodiment, the shape matching module 226 may include both the constraint optimization module and the tree search module. The shape matching module 226 may include information on which of the two methods (the constrained optimization method and the tree search method) produce more accurate results in different circumstances, and use either the constraint optimization module or the tree search module depending on the situation. In another embodiment, both the optimization module and the tree search module may each generate preliminary identified signs that may be further analyzed and chosen by the shape matching module 226 to produce final identified signs.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer-based method for recognizing sign language, comprising:
    receiving a depth image of a target subject using one or more cameras, the depth image comprising image pixels representing distances between parts of the target subject and the one or more cameras;
    classifying the depth image into a first portion representing a first hand of the target subject and a second portion representing a second hand of the target subject responsive to determining that the first hand and the second hand in the depth image overlap or adjoin; and
    outputting a sign represented by the first hand and the second hand in the depth image by matching shapes of the first portion and the second portion with stored shapes of hands.

2. The computer-based method of claim 1, further comprising generating a linked structure representing the first hand and the second hand from the depth image, the linked structure comprising two or more segments linked to each other.

3. The computer-based method of claim 2, wherein classifying the depth image comprises:
    generating a cost function representing a cost for classifying the two or more segments into the first hand and the second hand; and
    determining a hand shape for the first hand and the second hand that minimizes the cost function and satisfies constraint conditions representing characteristics of hands.

4. The computer-based method of claim 3, wherein the constraint conditions comprise:
    a first condition that closely located segments are likely to be segments of the same hand;
    a second condition that a first segment generated from a first cluster of image pixels includes more than one finger if a first thickness of the first cluster is larger than a threshold;
    a third condition that a second segment generated from a second cluster of image pixels include one finger if a second thickness of the second cluster is not larger than the threshold; and
    a fourth condition that a total length of segments classified to the first hand or the second hand does not exceed a maximum value.

5. The computer-based method of claim 2, classifying the depth image comprises:
    generating a directed acyclic graph structure based on the linked structure, the acyclic graph comprises nodes representing segments and indicates connective relationship between the nodes;

generating combinations of nodes that group a first set of nodes to the first hand and a second set of nodes to the second hand; and evaluating the combinations of nodes using one or more criteria representing characteristics of hands.

6. The computer-based method of claim 5, evaluating the combinations of the nodes comprises:

obtaining a first score representing linking of a first node to a second node classified to the same hand;

obtaining a second score representing distances between segments and palms of the hands to which the segments are classified;

obtaining a third score representing angles between linked segments classified to the same hand;

obtaining a fourth score representing distances between branching nodes and palms of the hands to which the branching nodes are classified, the branching nodes representing nodes linked to three or more nodes or linked to a palm and two or more nodes; and determining a combination having a lowest sum of the first score, the second score, the third score, and the fourth score.

7. The computer-based method of claim 1, further comprising detecting palms of the first and the second hands.

8. The computer-based method of claim 7, wherein detecting the first palm or the second palm comprises:

generating a skeleton line based on image pixels representing the first or the second hand;

determining candidate lines for including a center of the first palm or the second palm by obtaining local maximum widths of lines intersecting edges of image pixels outlining the first or the second hand, the lines perpendicular to the skeleton line; and determining the center of the candidate line that is closest to image pixels representing fingers of the first or the second hand as the center of the palm.

9. The computer-based method of claim 2, wherein generating the linked structure comprises performing thinning operations on the image pixels representing the first hand and the second hand.

10. A computer program product comprising a non-transitory computer readable medium structured to store instructions executable by a processor, the instructions, when executed cause the processor to:

receive a depth image of a target subject using one or more cameras, the depth image comprising image pixels representing distances between parts of the target subject and the one or more cameras;

classify the depth image into a first portion representing a first hand of the target subject and a second portion representing a second hand of the target subject responsive to determining that the first hand and the second hand in the depth image overlap or adjoin; and output a sign represented by the first hand and the second hand in the depth image by matching shapes of the first portion and the second portion with stored shapes of hands.

11. The computer program product of claim 10, further comprising instructions to generate a linked structure representing the first hand and the second hand from the depth image, the linked structure comprising two or more segments linked to each other.

12. The computer program product of claim 11, wherein instructions to classify the depth image comprise instructions to:

generate a cost function representing a cost for classifying the two or more segments into the first hand and the second hand; and determine a hand shape for the first hand and the second hand that minimizes the cost function and satisfies constraint conditions representing characteristics of hands.

13. The computer program product of claim 12, wherein the constraint conditions comprise:

a first condition that closely located segments are likely to be segments of the same hand;

a second condition that a first segment generated from a first cluster of image pixels includes more than one finger if a first thickness of the first cluster is larger than a threshold;

a third condition that a second segment generated from a second cluster of image pixels include one finger if a second thickness of the second cluster is not larger than the threshold; and a fourth condition that a total length of segments classified to the first hand or the second hand does not exceed a maximum value.

14. The computer program product of claim 12, wherein the instructions to classifying the digital images comprise instructions to:

generate a directed acyclic graph structure based on the linked structure, the acyclic graph comprises nodes representing segments and indicates connective relationship between the nodes;

generate combinations of nodes that group a first set of nodes to the first hand and a second set of nodes to the second hand; and evaluate the combinations of nodes using one or more criteria representing characteristics of hands.

15. The computer program product of claim 14, wherein the instructions to evaluate the combinations of the nodes comprise instructions to:

obtain a first score representing linking of a first node and a second node classified to the same hand;

obtain a second score representing distances between segments and palms of the hands to which the segments are classified;

obtain a third score representing angles between linked segments classified to the same hand;

obtain a fourth score representing distances between branching nodes and palms of the hands to which the branching nodes are classified, the branching nodes representing nodes linked to three or more nodes or linked to a palm and two or more nodes; and determine a combination having a lowest sum of the first score, the second score, the third score and the fourth score.

16. The computer program product of claim 10, further comprising instruction to detect a first palm of the first hand and a second palm of the second hand.

17. The computer program product of claim 16, wherein instructions to detect the first palm or the second palm comprise instructions to:

generate a skeleton line based on image pixels representing the first or the second hand;

determine candidate lines for including a center of the first palm or the second palm by obtaining local maximum widths of lines intersecting edges of image pixels outlining the first or the second hand, the lines perpendicular to the skeleton line; and determine the center of the candidate line that is closest to image pixels representing fingers of the first or the second hand as the center of the palm.

18. The computer program product of claim 11, wherein the instructions to generate the linked structure comprise instructions to perform thinning operations on the image pixels representing the first hand and the second hand.

19. A computer-based system for recognizing sign language comprising:
- one or more cameras for generating a depth image of a target subject, the depth image comprising image pixels representing distances between parts of the target subject and the one or more cameras;
- an image pre-processing module coupled to the one or more camera for classifying the depth image into a first portion representing a first hand of the target subject and a second portion representing a second hand of the target subject responsive to determining that the first hand and the second hand in the depth image overlap or adjoin; and
- a shape matching module coupled to the image pre-processing module, the shape matching module outputting a sign represented by the first hand and the second hand in the depth image by matching shapes of the first portion and the second portion with stored shapes of hands.

20. The computer-based system of claim 19, wherein the image pre-processing further generates a linked structure representing the first hand and the second hand from the depth image, the linked structure comprising two or more segments linked to each other.

21. The computer-based system of claim 19, wherein the shape matching module comprises a optimization module for generating a cost function representing a cost for classifying the two or more segments into the first hand and the second hand and for determining a hand shape for the first hand and the second hand that minimize the cost function and satisfies constraint conditions representing characteristics of hands.

22. The computer-based system of claim 21, wherein the constraint conditions comprise:
- a first condition that closely located segments are likely to be segments of the same hand;
- a second condition that a first segment generated from a first cluster of image pixels includes more than one finger if a first thickness of the first cluster is larger than a threshold;
- a third condition that a second segment generated from a second cluster of image pixels include one finger if a second thickness of the second cluster is not larger than the threshold; and
- a fourth condition that a total length of segments classified to the first hand or the second hand does not exceed a maximum value.

23. The computer-based system of claim 20, wherein the shape matching module comprises a tree search module that generates a directed acyclic graph structure based on the linked structure, the acyclic graph comprises nodes representing segments and indicates connective relationship between the nodes, generates combinations of nodes that group a first set of nodes to the first hand and a second set of nodes to the second hand, and evaluates the combinations of nodes using one or more criteria representing characteristics of hands.

24. The computer-based system of claim 23, the tree search module evaluates the combinations of the nodes by adding a first score representing linking of a first node to a second node classified to the same hand, a second score representing distances between segments and palms of the hands to which the segment is classified, a third score representing angles between linked segments classified to the same hand, and a fourth score representing distances between branching nodes and palms of the hands to which the branching nodes are classified, the branching nodes representing nodes linked to three or more nodes or linked to a palm and two or more nodes.

25. The computer-based system of claim 19, wherein the image pre-processing module detects a first palm of the first hand and a second palm of the second hand.

* * * * *